United States Patent
Ishikawa et al.

(10) Patent No.: US 10,067,778 B2
(45) Date of Patent: Sep. 4, 2018

(54) MANAGEMENT SYSTEM, RECORDING MEDIUM AND METHOD FOR MANAGING VIRTUAL MACHINES

(71) Applicant: FUJITSU LIMITED, Kawasaki-shi, Kanagawa (JP)

(72) Inventors: Tomonori Ishikawa, Setagaya (JP); Hidenori Ishikawa, Yokohama (JP); Shingo Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 416 days.

(21) Appl. No.: 14/100,706

(22) Filed: Dec. 9, 2013

(65) Prior Publication Data
US 2014/0196035 A1 Jul. 10, 2014

(30) Foreign Application Priority Data
Jan. 9, 2013 (JP) .................................. 2013-001459

(51) Int. Cl.
*G06F 9/455* (2006.01)
*G06F 9/50* (2006.01)

(52) U.S. Cl.
CPC ........ *G06F 9/45558* (2013.01); *G06F 9/5072* (2013.01); *G06F 2009/45575* (2013.01)

(58) Field of Classification Search
CPC ....... G06F 9/45558; G06F 2009/45575; G06F 9/5072
USPC .......................................................... 718/1
See application file for complete search history.

(56) References Cited

U.S. PATENT DOCUMENTS

| | | | | |
|---|---|---|---|---|
| 8,601,471 | B2* | 12/2013 | Beaty | G06F 9/45558 718/1 |
| 8,631,154 | B2* | 1/2014 | Bartfai-Walcott | H04L 47/2433 709/224 |
| 8,966,495 | B2* | 2/2015 | Kulkarni | G06F 9/45558 709/223 |
| 2007/0094668 | A1* | 4/2007 | Jacquot | G06F 9/50 718/104 |
| 2009/0293056 | A1* | 11/2009 | Ferris | G06F 9/5077 718/1 |
| 2010/0332889 | A1* | 12/2010 | Shneorson | G06Q 10/06 714/2 |
| 2012/0096460 | A1* | 4/2012 | Sekiguchi | G06F 9/45558 718/1 |
| 2017/0046640 | A1* | 2/2017 | Varadi | G06Q 10/06 |

FOREIGN PATENT DOCUMENTS

| | | |
|---|---|---|
| JP | 2003-223335 A | 8/2003 |
| JP | 2008-140240 A | 6/2008 |
| JP | 2011-039740 A | 2/2011 |

* cited by examiner

*Primary Examiner* — Meng An
*Assistant Examiner* — Willy W Huaracha
(74) *Attorney, Agent, or Firm* — Oblon, McClelland, Maier & Neustadt, L.L.P.

(57) ABSTRACT

An information processing system includes circuitry configured to identify a plurality of systems that each access at least one of a plurality of virtual machines executed by a server, generate, for each system, a value indicating whether performance of the system satisfies an agreement for the system if a virtual machine accessed by the system is stopped, determine a virtual machine to be stopped among the plurality of virtual machines based on the values.

12 Claims, 12 Drawing Sheets

CONFIGURATION CHANGE MANAGEMENT TABLE MT3

| ROW NUMBER | ADDED VIRTUAL MACHINE | SYSTEM USING ADDED VIRTUAL MACHINE | PURPOSE OF USE OF ADDED VIRTUAL MACHINE | NUMBERS OF VIRTUAL MACHINES USED FOR PURPOSES BY SYSTEM AFTER ADDITION | | | TIME WHEN VIRTUAL MACHINE IS ADDED |
|---|---|---|---|---|---|---|---|
| | | | | WEB SERVER | APS SERVER | DB SERVER | |
| 1 | VIRTUAL MACHINE VM76 | PERSONNEL MANAGEMENT SYSTEM SY1 | WEB SERVERS | 3 | 3 | 2 | AUGUST 20, 2012, 15:33 |
| 2 | VIRTUAL MACHINE VM77 | PERSONNEL MANAGEMENT SYSTEM SY1 | WEB SERVERS | 4 | 3 | 2 | AUGUST 21, 2012, 12:36 |
| 3 | VIRTUAL MACHINE VM78 | COMMUNICATION MANAGEMENT SYSTEM SY2 | APS | 2 | 3 | 2 | AUGUST 21, 2012, 19:33 |

| ROW NUMBER | SYSTEM USING ADDED VIRTUAL MACHINE | PURPOSE OF USE OF ADDED VIRTUAL MACHINE | NUMBER OF VIRTUAL MACHINES USED FOR PURPOSE BY SYSTEM AFTER ADDITION | AMOUNT OF CHANGE IN RESPONSE TIME (MILLISECONDS) | AMOUNT OF CHANGE IN MAXIMUM NUMBER OF SIMULTANEOUS POSSIBLE CONNECTIONS (OF TERMINALS) |
|---|---|---|---|---|---|
| 1 | PERSONNEL MANAGEMENT SYSTEM SY1 | WEB SERVER | 3 | -127 | +20 |
| 2 | PERSONNEL MANAGEMENT SYSTEM SY1 | WEB SERVER | 4 | -153 | +20 |
| 3 | PERSONNEL MANAGEMENT SYSTEM SY1 | APS | 3 | -312 | 0 |
| 4 | COMMUNICATION MANAGEMENT SYSTEM SY2 | WEB SERVER | 2 | -101 | +10 |
| 5 | COMMUNICATION MANAGEMENT SYSTEM SY2 | APS | 2 | -532 | 0 |
| 6 | COMMUNICATION MANAGEMENT SYSTEM SY2 | APS | 3 | -205 | 0 |
| 7 | ASSET MANAGEMENT SYSTEM SY3 | WEB SERVER | 2 | -111 | +10 |

IMPACT TABLE MT4

| ROW NUMBER | VIRTUAL MACHINE EXECUTED ON PHYSICAL MACHINE WITH INSUFFICIENT MEMORY | SYSTEM USING VIRTUAL MACHINE | PURPOSE OF USE OF VIRTUAL MACHINE | NUMBER OF VIRTUAL MACHINES USED FOR PURPOSE BY SYSTEM |
|---|---|---|---|---|
| 1 | VIRTUAL MACHINE VM6 | PERSONNEL MANAGEMENT SYSTEM SY1 | WEB SERVER | 4 |
| 2 | VIRTUAL MACHINE VM7 | COMMUNICATION MANAGEMENT SYSTEM SY2 | WEB SERVER | 2 |
| 3 | VIRTUAL MACHINE VM8 | COMMUNICATION MANAGEMENT SYSTEM SY2 | APS | 3 |
| 4 | VIRTUAL MACHINE VM9 | PERSONNEL MANAGEMENT SYSTEM SY1 | APS | 4 |
| 5 | VIRTUAL MACHINE VM10 | ASSET MANAGEMENT SYSTEM SY3 | WEB SERVER | 2 |
| 6 | VIRTUAL MACHINE V76 | PERSONNEL MANAGEMENT SYSTEM SY1 | WEB SERVER | 4 |

FIG. 9

| ROW NUMBER | VIRTUAL MACHINE EXECUTED ON PHYSICAL MACHINE WITH INSUFFICIENT MEMORY | SYSTEM USING ADDED VIRTUAL MACHINE | PURPOSE OF USE OF ADDED VIRTUAL MACHINE | NUMBER OF VIRTUAL MACHINES USED FOR PURPOSE BY SYSTEM AFTER ADDITION | AMOUNT OF IMPACT ON RESPONSE TIME (MILLISECONDS) | AMOUNT OF IMPACT ON MAXIMUM NUMBER OF SIMULTANEOUS POSSIBLE CONNECTIONS (OF TERMINALS) |
|---|---|---|---|---|---|---|
| 1 | VIRTUAL MACHINE VM6 | PERSONNEL MANAGEMENT SYSTEM SY1 | WEB SERVER | 4 | +153 | −20 |
| 2 | VIRTUAL MACHINE VM7 | COMMUNICATION MANAGEMENT SYSTEM SY2 | WEB SERVER | 2 | +101 | −10 |
| 3 | VIRTUAL MACHINE VM8 | COMMUNICATION MANAGEMENT SYSTEM SY2 | APS | 3 | +205 | 0 |
| 4 | VIRTUAL MACHINE VM9 | PERSONNEL MANAGEMENT SYSTEM SY1 | APS | 3 | +312 | 0 |
| 5 | VIRTUAL MACHINE VM10 | ASSET MANAGEMENT SYSTEM SY3 | WEB SERVER | 2 | +111 | −10 |
| 6 | VIRTUAL MACHINE VM76 | PERSONNEL MANAGEMENT SYSTEM SY1 | WEB SERVER | 4 | +153 | −20 |

CHANGE ESTIMATION TABLE TT1

| ROW NUMBER | SYSTEM USING VIRTUAL MACHINE EXECUTED ON PHYSICAL MACHINE WITH INSUFFICIENT MEMORY | PURPOSE OF USE OF VIRTUAL MACHINE | RESPONSE TIME (MILLISECONDS) | | | MAXIMUM NUMBER OF SIMULTANEOUS POSSIBLE CONNECTIONS (OF TERMINALS) | | | |
|---|---|---|---|---|---|---|---|---|---|
| | | | IMPACT AMOUNT | REQUESTED VALUE | CURRENT VALUE | IMPACT AMOUNT | REQUESTED VALUE | NUMBER OF CURRENT CONNECTIONS | CURRENT MAXIMUM NUMBER OF SIMULTANEOUS POSSIBLE CONNECTIONS |
| 1 | PERSONNEL MANAGEMENT SYSTEM SY1 | WEB SERVER | +153 | 3000 | 2778 | -20 | 60 | 13 | 60 |
| 2 | PERSONNEL MANAGEMENT SYSTEM SY1 | APS | +312 | 3000 | 2778 | 0 | 60 | 13 | 60 |
| 3 | COMMUNICATION MANAGEMENT SYSTEM SY2 | WEB SERVER | +101 | 2000 | 1621 | -10 | 40 | 8 | 40 |
| 4 | COMMUNICATION MANAGEMENT SYSTEM SY2 | APS | +205 | 2000 | 1621 | 0 | 40 | 8 | 40 |
| 5 | ASSET MANAGEMENT SYSTEM SY3 | WEB SERVER | +111 | 3000 | 2614 | -10 | 30 | 21 | 30 |

VIOLATION VERIFICATION TABLE TT2

LIST OF RISK VALUES

| ROW NUMBER | SYSTEM USING VIRTUAL MACHINE EXECUTED ON PHYSICAL MACHINE WITH INSUFFICIENT MEMORY | PURPOSE OF USE OF VIRTUAL MACHINE | RISK VALUE OF RESPONSE TIME | RISK VALUE OF MAXIMUM NUMBER OF SIMULTANEOUS POSSIBLE CONNECTIONS |
|---|---|---|---|---|
| 1 | PERSONNEL MANAGEMENT SYSTEM SY1 | WEB SERVER | 0.689 | 0.426 |
| 2 | PERSONNEL MANAGEMENT SYSTEM SY1 | APS | 1.405 | 0.000 |
| 3 | COMMUNICATION MANAGEMENT SYSTEM SY2 | WEB SERVER | 0.266 | 0.313 |
| 4 | COMMUNICATION MANAGEMENT SYSTEM SY2 | APS | 0.541 | 0.000 |
| 5 | ASSET MANAGEMENT SYSTEM SY3 | WEB SERVER | 0.288 | 1.111 |

| ROW NUMBER | SYSTEM USING VIRTUAL MACHINE EXECUTED ON PHYSICAL MACHINE WITH INSUFFICIENT MEMORY | PURPOSE OF USE OF VIRTUAL MACHINE | RISK VALUE OF RESPONSE TIME | WHETHER OR NOT SLA IS VIOLATED BY RESPONSE TIME | RISK VALUE OF MAXIMUM NUMBER OF SIMULTANEOUS POSSIBLE CONNECTIONS | WHETHER OR NOT SLA IS VIOLATED BY MAXIMUM NUMBER OF SIMULTANEOUS POSSIBLE CONNECTIONS | PENALTY AMOUNT | SUBSTANTIAL PENALTY VALUE |
|---|---|---|---|---|---|---|---|---|
| 1 | PERSONNEL MANAGEMENT SYSTEM SY1 | WEB SERVER | 0.689 | NOT VIOLATED | 0.426 | NOT VIOLATED | 2000,000 | 137,838 |
| 2 | PERSONNEL MANAGEMENT SYSTEM SY1 | APS | 1.405 | VIOLATED | 0.000 | NOT VIOLATED | 2000,000 | — |
| 3 | COMMUNICATION MANAGEMENT SYSTEM SY2 | WEB SERVER | 0.266 | NOT VIOLATED | 0.313 | NOT VIOLATED | 1000,000 | 31,250 |
| 4 | COMMUNICATION MANAGEMENT SYSTEM SY2 | APS | 0.541 | NOT VIOLATED | 0.000 | NOT VIOLATED | 1000,000 | 54,090 |
| 5 | ASSET MANAGEMENT SYSTEM SY3 | WEB SERVER | 0.288 | NOT VIOLATED | 1.111 | VIOLATED | 1500,000 | — |

PENALTY MANAGEMENT TABLE TT3

MANAGEMENT SYSTEM, RECORDING MEDIUM AND METHOD FOR MANAGING VIRTUAL MACHINES

CROSS-REFERENCE TO RELATED APPLICATION

This application is based upon and claims the benefit of priority of the prior Japanese Patent Application No. 2013-001459, filed on Jan. 9, 2013, the entire contents of which are incorporated herein by reference.

FIELD

The embodiment discussed herein is related to a management system, a recording medium and a method for managing virtual machines.

BACKGROUND

Recently, cloud data centers have been established by providers of cloud services such as Infrastructure as a Service (IaaS). In each of the cloud data centers, a large number of physical machines (servers) are arranged and a plurality of virtual machines are provided on each of the physical machines by a virtualization technique.

Operations of a customer who uses a cloud service are achieved by a system built by one or more virtual machines. The customer uses a terminal connected to the virtual machines through a network such as an intranet and performs the operations.

A service provider that has established a cloud data center makes a service level agreement (SLA) with each of customers. Service level evaluation items for evaluating performance such as a response time, the maximum number of simultaneous possible connections, and utilization, requested values of the evaluation items for evaluating performance, penalty amounts, and the like are defined in the SLA in order to satisfy requests for the contents and quality of a service to be provided. The service provider operates and monitors virtual machines on the basis of the SLA.

The number of virtual machines to be provided on a single physical machine is determined so that the total of resources of the provided virtual machines does not exceed an upper limit on an available resource provided by the physical machine. This is due to the fact that if all the virtual machines are executed and the total of resources used by the virtual machines exceeds the upper limit on the available resource provided by the physical machine, a requested value of an evaluation item defined in the SLA may not be satisfied. It is, however, rare that the virtual machines are executed for a long time while using the resource of the physical machine so that the total of the resources used by the virtual machines exceeds the upper limit on the available resource provided by the physical machine. Recently, over-commit has been used, in which virtual machines are provided so that the total of resources of the virtual machines exceeds an upper limit on an available resource provided by a physical machine.

For example, when the capacity of a memory of a certain physical machine is 64 GB, virtual machines that use a memory with the maximum capacity of 98 GB may be provided on the certain physical machine.

Japanese Laid-open Patent Publications Nos. 2003-223335, 2008-140240, and 2011-39740 are examples of related art.

SUMMARY

According to an aspect of the invention, an information processing system includes circuitry configured to identify a plurality of systems that each access at least one of a plurality of virtual machines executed by a server, generate, for each system, a value indicating whether performance of the system satisfies an agreement for the system if a virtual machine accessed by the system is stopped, determine a virtual machine to be stopped among the plurality of virtual machines based on the values.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a configuration change management table according to the embodiment;

FIG. 6 is a diagram illustrating an example of an impact table according to the embodiment;

FIG. 8 is a diagram illustrating an example of physical machine configuration information according to the embodiment;

FIG. 9 is a diagram illustrating an example of a change estimation table according to the embodiment;

FIG. 10 is a diagram illustrating an example of a violation verification table according to the embodiment;

FIG. 11 is a diagram illustrating an example of risk values according to the embodiment; and FIG. 12 is a diagram illustrating an example of a penalty management table according to the embodiment.

DESCRIPTION OF EMBODIMENT

According to the consideration of the present invention, when the total memory capacity used by currently executed virtual machines exceeds 64 GB, at least one of the currently executed virtual machines is stopped. After the stop of a virtual machine, evaluation items that are different for agreements satisfy requirements. Thus, a service provider stops an appropriate virtual machine while considering impacts caused by the execution states and stop of virtual machines of which the states change at any time.

According to the embodiment described below, a virtual machine to be stopped may be determined with high accuracy.

Hereinafter, the embodiment is described with reference to the accompanying drawings.

Figure 1:
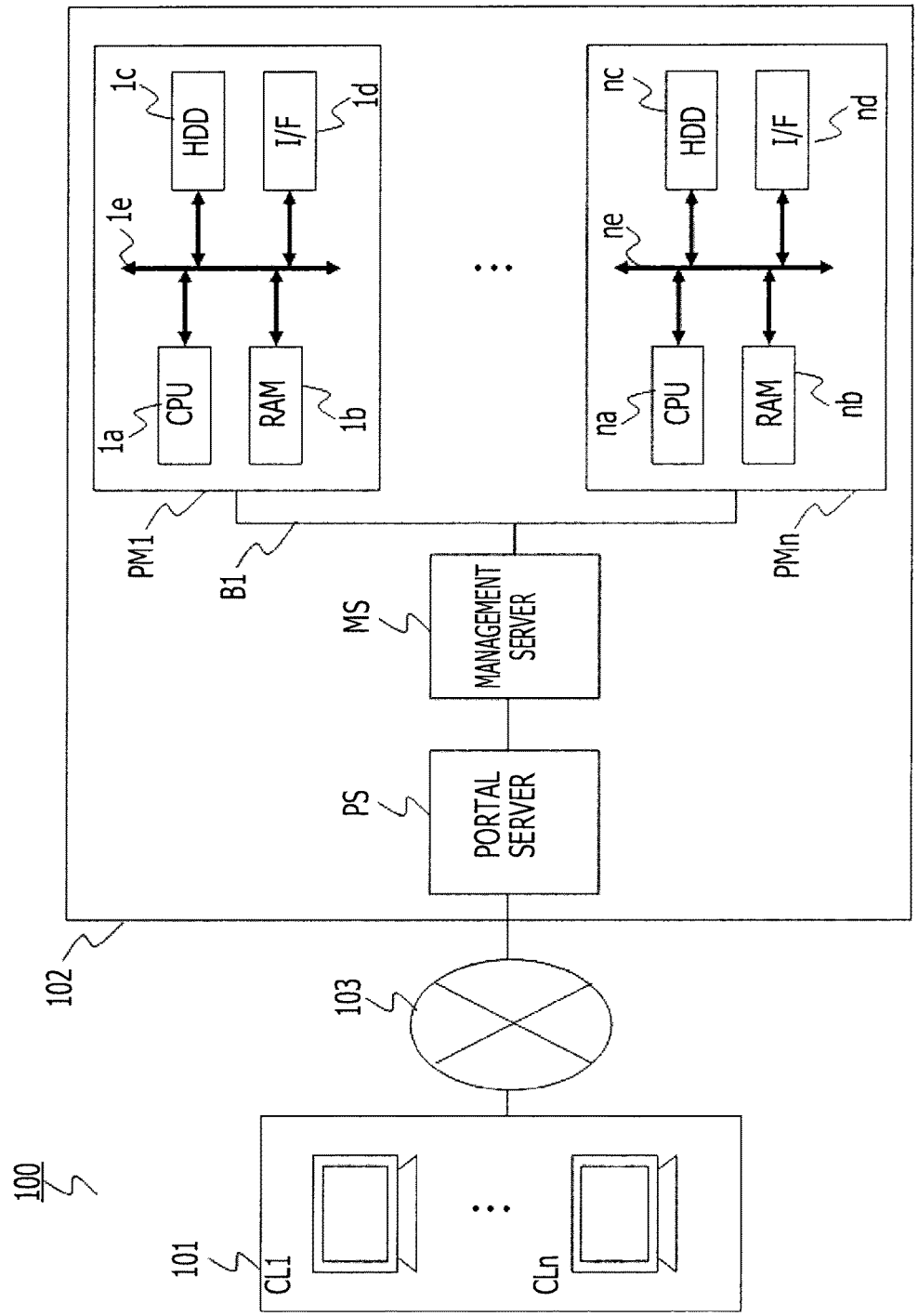
FIG. 1 is a diagram illustrating an example of a hardware configuration of a cloud system according to the embodiment.

FIG. 1 is a diagram illustrating an example of a hardware configuration of a cloud system according to the embodiment. A cloud system 100 has a client terminal group 101 including a plurality of client terminals CL1 to CLn, a cloud data center 102, and a network 103. The network 103 is the Internet, an intranet, or the like and connects the client terminal group 101 to the cloud data center 102.

A plurality of physical machines PM1 to PMn are arranged in the cloud data center 102, and are servers for example. One or more virtual machines are provided on each of the physical machines PM 1 to PMn. The cloud data center 102 includes a management server MS and a portal server PS. The management server MS is connected to the physical machines PM1 to PMn through a bus B1. The management server MS monitors the execution states of the virtual machines on the physical machines PM1 to PMn, controls the execution of the virtual machines, and the like. The portal server PS receives a request to process information from the client terminal group 101 through the network 103 and transfers the request to the management server MS.

The physical machine PM1 includes a CPU 1a, a RAM 1b, a hard disk drive (HDD) 1c, an interface 1d, and a bus 1e.

The bus 1e connects the CPU 1a, the RAM 1b, the HDD 1c, and the interface 1d to each other.

The HDD 1c stores various programs such as a virtualization program and data to be used to execute the programs.

The CPU 1a executes the various programs stored in the HDD 1c and controls the other devices included in the physical machine PM1. When the CPU 1a executes the virtualization program, the physical machine PM1 is virtualized. As a result, the CPU 1a, a memory, and the like are assigned to the virtual machines to be provided on the physical machine PM1.

The RAM 1b stores temporary data, the various programs loaded by the CPU 1a from the HDD 1c, and the like.

The interface 1d is connected to the other physical machines PM2 to PMn and the management server MS through the bus B1 and transmits and receives data to and from the other physical machines PM2 to PMn and the management server MS through the bus B1.

The other physical machines PM2 to PMn have the same configuration as the physical machine PM1.

Figure 2:
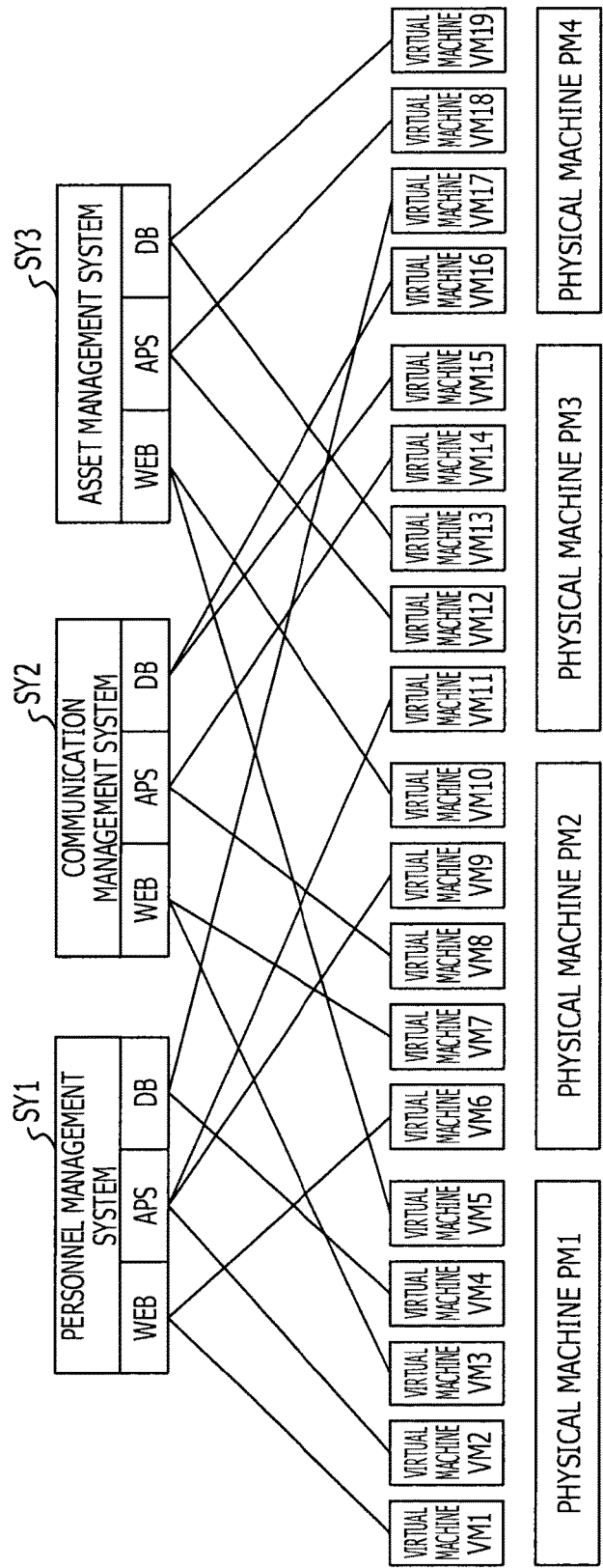
FIG. 2 is a diagram illustrating an example of the states of virtual machines to be executed on physical machines arranged in a cloud data center according to the embodiment.

FIG. 2 is a diagram illustrating an example of the states of the virtual machines to be executed on the physical machines PM1 to PMn arranged in the data center according to the embodiment.

The physical machines PM1 to PM4 illustrated in FIG. 1 use overcommit, while virtual machines are provided on each of the physical machines PM1 to PM4 and may use a resource exceeding an upper limit on an available resource provided by the physical machine. In the example illustrated in FIG. 2, virtual machines VM1 to VM5 are executed on the physical machine PM1; virtual machines VM6 to VM10 are executed on the physical machine PM2; virtual machines VM11 to VM15 are executed on the physical machine PM3; and virtual machines VM16 to VM19 are executed on the physical machine PM4.

Each of the virtual machines VM1 to VM19 is used by any of a personnel management system SY1, a communication management system SY2, and an asset management system SY3. The personnel management system SY1, the communication management system SY2, and the asset management system SY3 are available through the cloud terminals CL1 to CLn to a customer who uses the cloud system 100.

As an example, the virtual machines VM1, VM2, VM4, VM6, VM9, VM11, and VM17 are used by the personnel management system SY1 for managing personnel information and calculating salaries. Among the virtual machines VM1, VM2, VM4, VM6, VM9, VM11, and VM17, the virtual machines VM1 and VM6 are used as web servers, the virtual machines VM2, VM9, and VM11 are used as application servers (APSs), and the virtual machines VM4 and VM17 are used as database (DB) servers.

As another example, the virtual machines VM3, VM7, VM8, VM14, VM15, and VM16 are used by the communication management system SY2 for transmitting and receiving mails and the like. Among the virtual machines VM3, VM7, VM8, VM14, VM15, and VM16, the virtual machines VM3 and VM7 are used as web servers, the virtual machines VM8 and VM14 are used as application servers (APSs), and the virtual machines VM15 and VM16 are used as database (DB) servers.

As another example, the virtual machines VM5, VM10, VM12, VM13, VM18, and VM19 are used by the asset management system SY3. Among the virtual machines VM5, VM10, VM12, VM13, VM18, and VM19, the virtual machines VM5 and VM10 are used as web servers, the virtual machines VM12 and VM18 are used as application servers (APSs), and the virtual machines VM13 and VM19 are used as database (DB) servers.

Service level evaluation items for evaluating performance defined in an SLA signed between a customer and a service provider, requested values of the evaluation items for evaluating performance, penalty amounts when the requested values are not satisfied, and the like are set in each of the personnel management system SY1, the communication management system SY2, and the asset management system SY3.

For example, information that indicates that a response time is 3000 ms or less, the maximum number of simultaneous possible connections is 60 terminals, and a penalty amount is 200,000 yen is set in the personal management system SY1. In addition, information that indicates that a response time is 2000 ms or less, the maximum number of simultaneous possible connections is 40 terminals, and a penalty amount is 100,000 yen is set in the communication management system SY2. Information that indicates that a response time is 3000 ms or less, the maximum number of simultaneous possible connections is 30 terminals, and a penalty amount is 150,000 yen is set in the asset management system SY3.

The evaluation items for evaluating performance include not only the response times and the maximum numbers of simultaneous possible connections but also service delivery times, utilization, failure recovery times, and the like in some cases.

In the example illustrated in FIG. 2, virtual machines that are used by the different systems for different purposes are executed on each of the physical machines PM1 to PM4. The management server MS illustrated in FIG. 1 monitors the execution of the virtual machines on the physical machines PM1 to PM4 and controls the addition and stop of virtual machines so as to satisfy the requested values of the evaluation items for evaluating performance set in the systems SY1 to SY3 for the physical machines PM1 to PM4 illustrated in FIG. 2.

In order to stop any of virtual machines executed on one physical machine, impacts, caused by the stop of the virtual machine, on the systems SY1 to SY3 are considered. For example, in order for the management server MS illustrated in FIG. 1 to stop the virtual machine VM1 used by the personal management system SY1 illustrated in FIG. 2, the management server MS determines whether or not the response times of the personal management systems SY1, the communication systems SY2 and the asset management systems SY3 and the maximum numbers of simultaneous possible connections of the management systems SY1 to SY3 satisfy the requested values.

Since impacts, caused by the stop of a virtual machine, on the systems SY1 to SY3 vary depending on execution states of the virtual machines at the time of the stop of the virtual machine, the management server MS preferably makes the determination using highly accurate data. In addition, since the evaluation items for evaluating performance defined in the SLA and the requested values of the evaluation items for evaluating performance vary for the systems SY1 to SY3, the management server MS preferably makes the determination on the basis of the evaluation items for evaluating performance and the requested values of the evaluation items for evaluating performance.

The management server MS according to the embodiment uses a virtual machine determination program PG4 (described later) to accurately estimate impacts, caused by the stop of virtual machines, on the evaluation items for evaluating performance and determine a virtual machine to be stopped.

Figure 3:
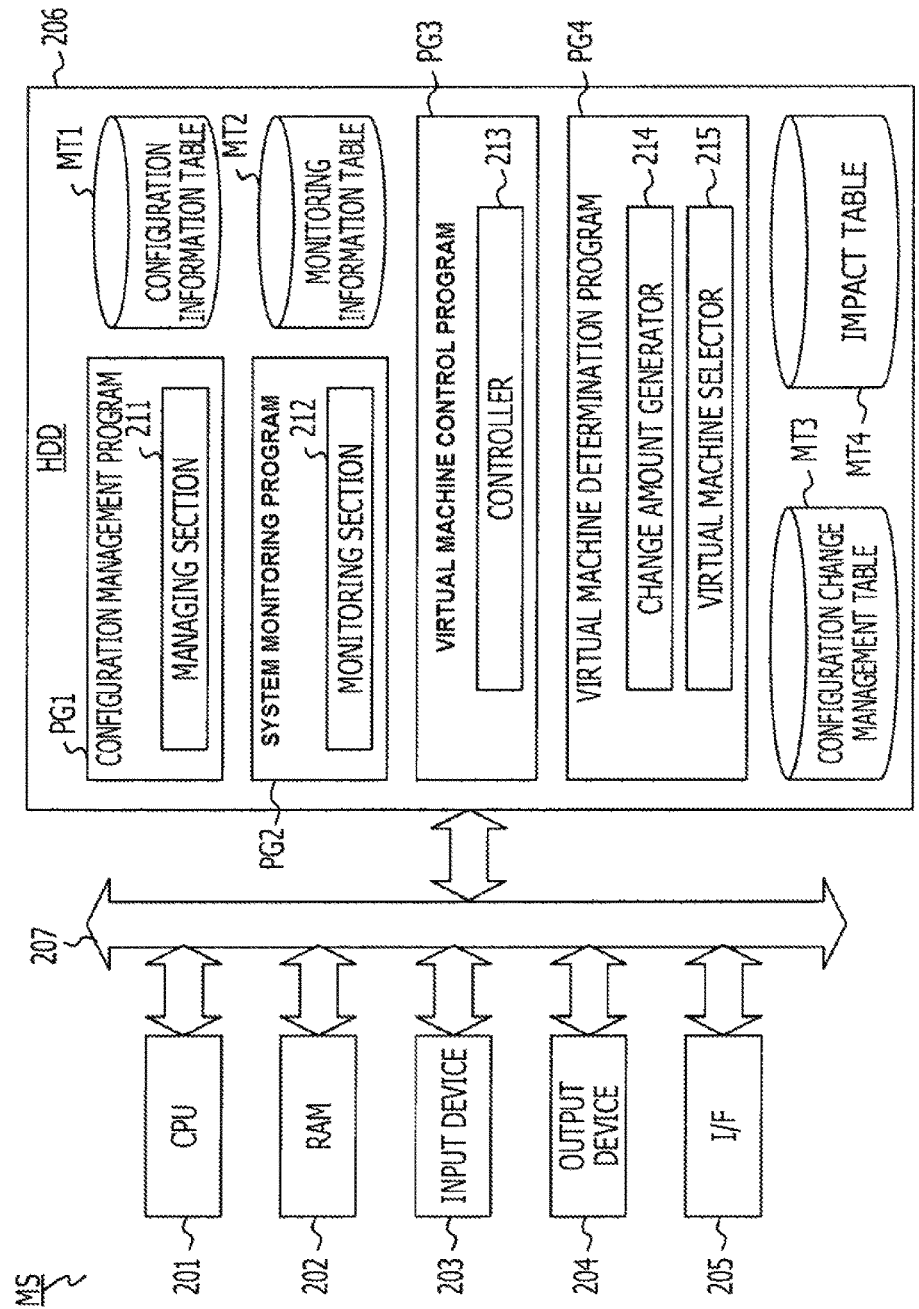
FIG. 3 is a diagram illustrating the configuration of a management server according to the embodiment.

FIG. 3 is a diagram illustrating the configuration of the management server MS according to the embodiment. The management server MS illustrated in FIG. 3 has a CPU 201, a RAM 202, an input device 203 such as a mouse or a keyboard, an output device 204 such as a display, an interface 205, a hard disk drive (HDD) 206, and a bus 207. The interface 205 is connected to the physical machines PM1 to PMn and the portal server PS.

The HDD 206 stores a configuration management program PG1, a system monitoring program PG2, a virtual machine control program PG3, the virtual machine determination program PG4 (described later), and the like. The configuration management program PG1 is used to manage the configurations of the physical machines and the configurations of the virtual machines. The system monitoring program PG2 is used to monitor usage states of the CPUs and memories of the physical machines, response times of the systems, and the like. The virtual machine control program PG3 causes each of the physical machines to add and stop a virtual machine. The HDD 206 has tables for storing data to be used to execute the programs, while the tables are a configuration information table MT1, a monitoring information table MT2, a configuration change management table MT3 (described later), an impact table MT4 (described later), and the like. The configuration information table MT1 stores information of virtual and physical machines used by each of the systems SY1 to SY3 and the maximum numbers of simultaneous possible connections of the systems SY1 to SY3. The monitoring information table MT2 stores the requested values of the evaluation items for evaluating performance set in each of the systems SY1 to SY3 and current values of the evaluation items for evaluating performance.

The RAM 202 stores temporary data, the various programs loaded by the CPU 201 from the HDD 206, and the like.

The CPU 201 executes the various programs stored in the HDD 206 and controls the other devices included in the management server MS. For example, the CPU 201 executes the configuration management program PG1 and uses a managing section 211 to cause the configuration information table MT1 to store the current maximum number of simultaneous possible connections of each of the systems SY1 to SY3 and information that indicates the virtual machines executed on the physical machines, the systems using the virtual machines, and the purposes of the use of the virtual machines. In addition, the CPU 201 executes the system monitoring program PG2 and uses a monitoring section 212 to monitor the physical machines and the virtual machines and cause the monitoring information table MT2 to store the requested values of the evaluation items for evaluating performance set in each of the systems SY1 to SY3 and the current values of the evaluation items for evaluating performance. The CPU 201 executes the virtual machine control program PG3 and uses a controller 213 to cause a physical machine to add or stop a virtual machine. Furthermore, the CPU 201 executes the virtual machine determination program PG4 so as to execute a process of determining a virtual machine to be stopped. The process of determining a virtual machine to be stopped includes a process of generating and storing the amount of change by a change amount generator 214 and a process of selecting, by a virtual machine selector 215, a machine to be stopped, as described below.

Process of Generating and Storing Amount of Change

Figure 4:
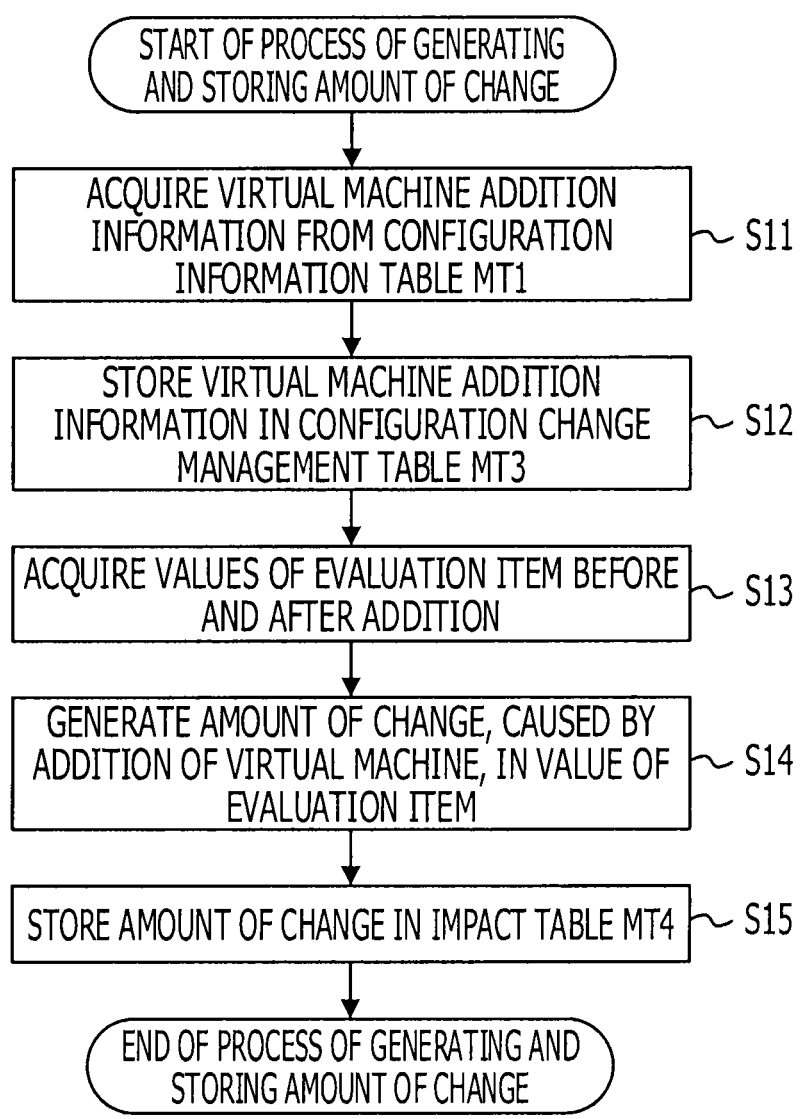
FIG. 4 is a flowchart of a process of generating and storing the amount of change by the management server according to the embodiment.

FIG. 4 is a flowchart of the process of generating and storing the amount of change by the management server MS according to the embodiment.

When a virtual machine that has a capacity determined for a system and a purpose of the use of the virtual machine is added to a certain physical machine by the controller 213 of the virtual machine control program PG3, the CPU 201 executes the configuration management program PG1 and updates the configuration information table MT1. Then, the CPU 201 executes the virtual machine determination program PG4 and executes the process (illustrated in FIG. 4) of generating and storing the amount of change.

In the example illustrated in FIG. 2, when a virtual machine VM76 is added as a web server of the personnel management system SY1 to the physical machine PM2, the CPU 201 executes the configuration management program PG1 and causes the configuration information table MT1 to store information indicating that the virtual machine VM76 is added as the web server of the personnel management system SY1 to the physical machine PM2. Then, the CPU 201 executes the virtual machine determination program PG4.

First, the CPU 201 acquires, from the configuration information table MT1, virtual machine addition information that indicates the "added virtual machine", a "system using the added virtual machine", a "purpose of the use of the added virtual machine", and "the numbers of virtual machines used by the system for the purposes" (in step S11).

In the aforementioned example, the CPU 201 acquires, from the configuration information table MT1, virtual machine addition information that indicates the "added virtual machine VM76", the "personnel management system SY1" using the added virtual machine VM76", a "web server" that is the purpose of the use of the virtual machine VM76, and information indicating that "the number of the virtual machines used as web servers by the personnel management system SY1 is 3, the number of the virtual machines used as application servers (APSs) by the personnel management system SY1 is 3, and the number of the virtual machines used as database (DB) servers by the personnel management system SY1 is 2.

Then, the CPU 201 causes the configuration change management table MT3 to store the acquired virtual machine addition information (in step S12).

FIG. 5 is a diagram illustrating an example of the configuration change management table MT3 according to the embodiment. The configuration change management table MT3 stores virtual machine addition information acquired from the configuration information table MT1. Specifically, The configuration change management table MT3 stores the virtual machine addition information indicating "added virtual machines", "systems using the added virtual machines", "purposes of the use of the added virtual machines", "the numbers of virtual machines used by the system for the purposes after the addition", and "times when the virtual machines are added".

For example, the configuration change management table MT3 stores, in the first row, virtual machine addition information indicating that "the virtual machine VM76 is added as the web server of the personnel management system SY1 on Aug. 20, 2012 at 15 o'clock 33 minutes" and "the personnel management system SY1 uses the three web servers, the three application servers (APSs), and the two database (DB) servers after the addition".

The configuration change management table MT3 stores, in the second row, virtual machine addition information acquired due to the addition of a virtual machine VM77 after the addition of the virtual machine VM76 and indicating that "the virtual machine VM77 is added as a web server of the personnel management system SY1 on Aug. 21, 2012 at 12 o'clock 36 minutes" and "the personnel management system SY1 uses the four web servers, the three application servers (APSs), and the two database (DB) servers after the addition".

The configuration change management table MT3 stores, in the third row, virtual machine addition information acquired due to the addition of a virtual machine VM78 after the addition of the virtual machine VM77 and indicating that "the virtual machine VM78 is added as an application server (APS) of the communication management system SY2 on Aug. 21, 2012 at 19 o'clock 33 minutes" and "the communication management system SY2 uses the two web servers, the three application servers (APSs), and the two database (DB) servers after the addition".

In this manner, the configuration change management table MT3 stores virtual machine addition information when a virtual machine is added.

Returning to FIG. 4, after step S12, the CPU 201 acquires a value of an evaluation item before the addition of the virtual machine and a value of the evaluation item after the addition of the virtual machine (in step S13). If the evaluation item is the response time, the CPU 201 acquires, from the monitoring information table MT2, the average of a response time at a predetermined time (of, for example, 10 minutes) before the addition of the virtual machine and a response time at the predetermined time after the addition of the virtual machine. If the evaluation item is the maximum number of simultaneous possible connections, the CPU 201 acquires, from the configuration information table MT1, the maximum number of simultaneous possible connections before the addition of the virtual machine and the maximum number of simultaneous possible connections after the addition of the virtual machine. In this case, the maximum numbers of simultaneous possible connections indicate the maximum numbers of terminals to be simultaneously connected to the servers (web servers, application servers, and database servers) of the system.

After step S13, the CPU 201 generates the amount of change between the value of the evaluation item before the addition of the virtual machine and the value of the evaluation item after the addition of the virtual machine (in step S14). Then, the CPU 201 causes the impact table MT4 to store the generated amount of the change (in step S15). Before a virtual machine to be stopped is determined, the amount, stored in the impact table MT4, of the change is used to generate a value of an impact, caused by the stop, on the value of the evaluation item of the interested system, as described later.

FIG. 6 is a diagram illustrating an example of the impact table MT4 according to the embodiment. The impact table MT4 stores the amounts of changes, caused by the addition of a virtual machine to a system, in the values of the evaluation items for evaluating performance of the systems.

Specifically, the CPU 201 causes, on the basis of the configuration change management table MT3 and the amount generated in step S14, the impact table MT4 to store impact information that indicates the "system to which the virtual machine is added", the "purpose of the use of the added virtual machine", the "numbers of virtual machines used for the purpose by the system", and "the amounts of changes in the values of the evaluation items for evaluating performance of the system".

For example, when the virtual machine VM76 indicated in the first row of the configuration change management table MT3 illustrated in FIG. 5 is added to the physical machine PM2, the impact table MT4 stores impact information that indicates that "the single virtual machine is added as a web server to the personnel management system SY1, and as a result, the number of web servers of the personnel management system SY1 is 3, the response time is reduced by 127 ms, and the maximum number of simultaneous possible connections is increased by 20 terminals", as indicated in the first row of the impact table MT4 illustrated in FIG. 6.

When the virtual machine VM77 indicated in the second row of the configuration change management table MT3 illustrated in FIG. 5 is added to the physical machine PM4, the impact table MT4 stores impact information that indicates that "the single virtual machine is added as a web server to the personnel management system SY1, and as a result, the number of web servers of the personnel management system SY1 is 4, the response time is reduced by 153 ms, and the maximum number of simultaneous possible connections is increased by 20 terminals", as indicated in the second row of the impact table MT4 illustrated in FIG. 6.

When the virtual machine VM78 indicated in the third row of the configuration change management table MT3 illustrated in FIG. 5 is added to the physical machine PM4, the impact table MT4 stores impact information that indicates that "the single virtual machine is added as a web server to the communication management system SY2, and as a result, the number of web servers of the communication management system SY2 is 2, the response time is reduced by 101 ms, and the maximum number of simultaneous possible connections is increased by 10 terminals", as indicated in the fourth row of the impact table MT4 illustrated in FIG. 6.

In this manner, when a virtual machine is added to a system, the CPU 201 executes the process (illustrated in FIG. 4) of generating and storing the amount of change, thereby causes the configuration change management table MT3 to store virtual machine addition information, generates the amount of change, caused by the addition of the virtual machine, in the value of the evaluation item for the system using the virtual machine and the purpose of the use of the virtual machine, and causes the impact table MT4 to store the amount of the change and the like.

Process of Selecting Machine to be Stopped

Figure 7:
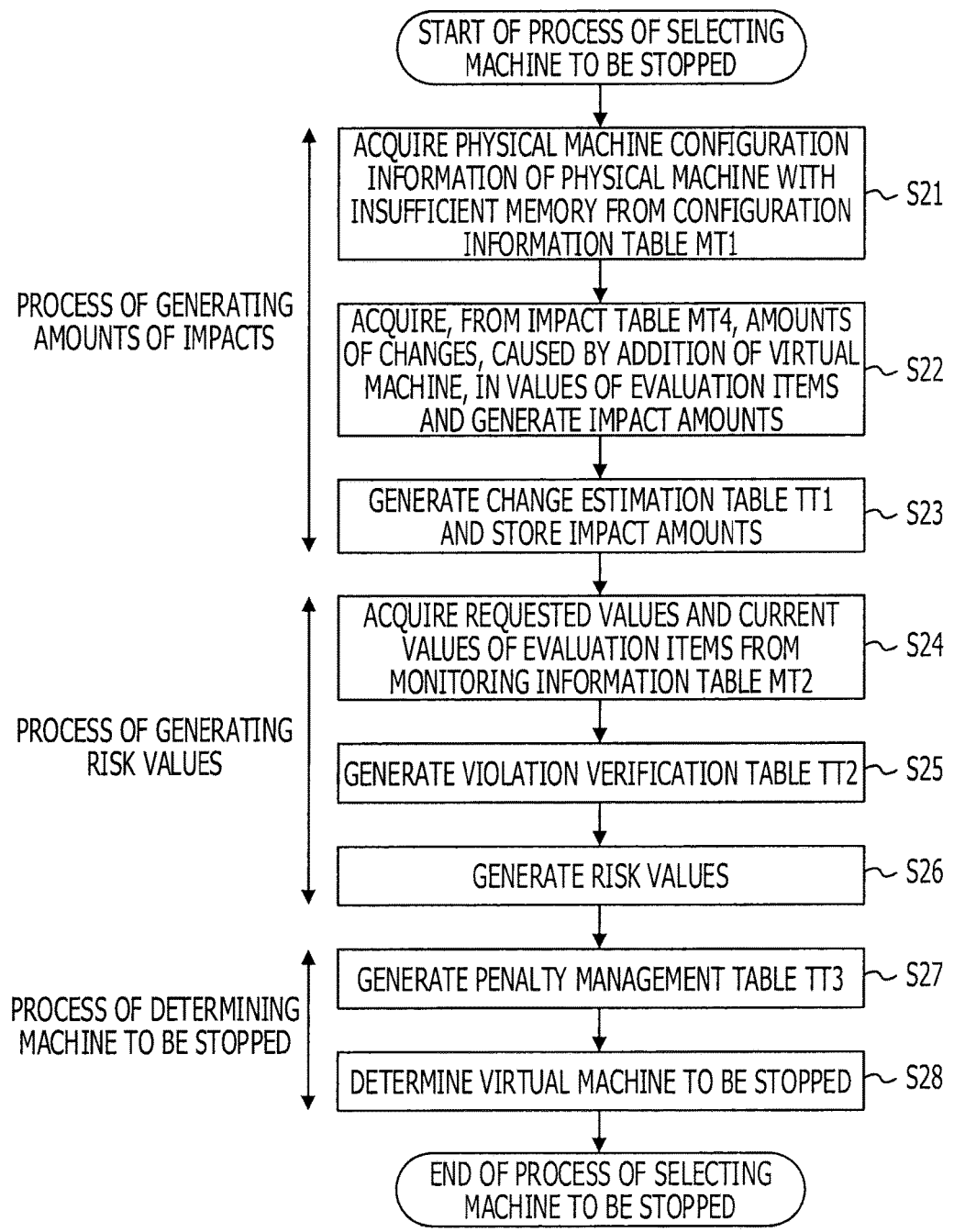
FIG. 7 is a flowchart of a process of selecting, by the management server according to the embodiment, a machine to be stopped.

FIG. 7 is a flowchart of a process of selecting, by the management server MT according to the embodiment, a machine to be stopped.

If the monitoring section 212 of the system monitoring program PG2 detects that a memory of any of the physical machines PM1 to PMn is insufficient, the CPU 201 executes the virtual machine determination program PG4 and executes the process (illustrated in FIG. 7) of selecting a virtual machine to be stopped from among virtual machines executed on the physical machine of which the memory is insufficient.

The process of selecting a virtual machine to be stopped includes a process (steps S21 to S23) of generating the amount of an impact, caused by the stop of a virtual machine, on an evaluation item, a process (steps S24 to S26) of generating a risk amount indicating a risk that the value of the evaluation item does not satisfy a requested value, and a process (steps S27 and S28) of determining a virtual machine to be stopped on the basis of a penalty amount and the risk value. The process of selecting a virtual machine to be stopped is described below on the assumption that the memory of the physical machine PM2 illustrated in FIG. 2 is insufficient.

First, the CPU 201 acquires, from the monitoring information table MT2, information of the "physical machine PM2" with the insufficient memory and acquires, from the configuration information table MT1, physical machine configuration information indicating "virtual machines executed on the physical machine with the insufficient memory", "systems using the virtual machines", "purposes of the use of the virtual machines", and the "numbers of the virtual machines used for the purposes by the systems" (in step S21). Accordingly, the CPU 201 acquires the information to identify the systems using all the virtual machines executed on the physical machine PM2, the purposes of the use of all the virtual machines, and the numbers of virtual machines used for the same purposes by the systems.

FIG. 8 is a diagram illustrating an example of the physical machine configuration according to the embodiment. The physical machine configuration information acquired by the CPU 201 in step S21 indicates the systems (personnel management system SY1, communication management system SY2, and asset management system SY3) using the virtual machines VM6 to VM10 and VM76 executed on the physical machine PM2, the purposes (web servers and application servers (APSs)) of the use of the virtual machines VM6 to VM10 and VM76, and the numbers of the virtual machines used for the purposes by the systems. Any of the virtual machines VM6 to VM10 and VM76 is selected as a virtual machine to be stopped.

Returning to FIG. 7, the CPU 201 acquires, from the impact table MT4, the amounts of changes in the values of the evaluation items for evaluating performance, while the acquired amounts of the changes match combinations of the "systems using the virtual machines", the "purposes of the use of the virtual machines", and the "numbers of the virtual machines used for the purposes by the systems" (in step S22). In this case, the "systems using the virtual machines", the "purposes of the use of the virtual machines", and the "numbers of the virtual machines used for the purposes by the systems" are indicated in the physical machine configuration information (illustrated in FIG. 8) acquired in step S21. In addition, the CPU 201 generates the amounts of impacts, caused by the stop of a virtual machine, on the evaluation items for evaluating performance of the systems for each of the virtual machines (in step S22).

If a single virtual machine is stopped, the amounts of impacts are differences between values of the evaluation items for evaluating performance of a system that has used the virtual machine before the stop of the virtual machine and values of the evaluation items for evaluating performance of the system after the stop of the virtual machine. In the embodiment, a resource that is determined on the basis of a system using a virtual machine and a purpose of the use of the virtual machine is assigned to the virtual machine. Thus, if a single virtual machine is stopped, the CPU 201 generates the amounts of impacts while estimating that values of the evaluation items for evaluating performance are changed back to values at the time of the addition of the single virtual machine or another virtual machine. For example, the amounts of impacts on the evaluation items for evaluating performance when the number of web servers of the personnel management system SY1 is changed from 4 to 3 are equal to the amounts of changes of the evaluation items for evaluating performance when the number of web servers of the personnel management system SY1 is changed from 3 to 4. Specifically, the CPU 201 generates the amounts of impacts so that the signs of the generated amounts of the impacts are opposite to the signs of the amounts of changes.

If a single virtual machine is added, a single virtual machine is stopped, the "same system uses the virtual machines", "purposes of the use of the virtual machines are the same", and the "number of virtual machines used for the purpose by the system is not changed", the amounts of impacts caused by the addition of the virtual machine and the stop of the virtual machine do not vary depending on the virtual machines.

For example, for the virtual machine VM6 indicated in the first row of the physical machine configuration information illustrated in FIG. 8, the CPU 201 acquires, from the second row of the impact table MT4 illustrated in FIG. 6 as the amounts of changes in the values of the evaluation items for evaluating performance, amounts "−153" (ms) and "+20" (terminals) that are the amounts of changes in the response time and the maximum number of simultaneous possible connections, while the second row of the impact table MT4 matches a combination of the "personnel management system SY1" using the virtual machine VM6, the purpose ("web server") of the use of the virtual machine VM6, and "4" that is the number of virtual machines used as web servers by the personnel management system SY1. Then, the CPU 201 generates an amount of "+153" (ms) and an amount of "−20" (terminals). In this case, the amount of "+153" (ms) is the amount of an impact, caused by the stop of the virtual machine VM6, on the response time of the personnel management system SY1, and the amount of "−20" (terminals) is the amount of an impact, caused by the stop of the virtual machine VM6, on the maximum number of simultaneous possible connections of the personnel management system SY1. In the same manner, the CPU 201 generates the amounts of impacts for the virtual machines VM7 to VM10 and VM76 executed on the physical machine PM2.

Then, the CPU 201 generates a change estimation table TT1 and causes the change estimation table TT1 to store the impact amounts generated for the virtual machines VM6 to VM10 and VM76 in step S22 (in step S23).

FIG. 9 is a diagram illustrating an example of the change estimation table TT1 according to the embodiment. FIG. 9 illustrates the change estimation table TT1 generated on the basis of the impact table MT4 illustrated in FIG. 6 and the physical machine configuration information illustrated in FIG. 8.

For example, the first row of the change estimation table TT1 indicates the impact amounts of "+153" and "−20" that are generated on the basis of the amounts, indicated in the second row of the impact table MT4 (illustrated in FIG. 6), of the changes while the second row of the impact table MT4 matches the combination of the "personnel management system SY1" using the virtual machine VM6 indicated in the first row of the physical machine configuration information (illustrated in FIG. 8), the purpose ("web server") of the use of the virtual machine VM6, and "4" that is the number of the virtual machines used as the web servers by the personnel management system SY1. The first row of the change estimation table TT1 indicates that "if the virtual machine VM6 among the four virtual machines used as the web servers of the personnel management system SY1 is stopped, it is expected that the response time is increased by 153 ms and the maximum number of simultaneous possible connections is reduced by 20 terminals".

Similarly, impact amounts indicated in the second to sixth rows of the change estimation table TT1 correspond to the amounts of changes, while the amounts of the changes are indicated in the fourth, sixth, third, seventh, and second rows of the impact table TM4 illustrated in FIG. 6. The amounts of impacts that are caused by the virtual machines VM6 and VM76 indicated in the first and sixth rows of the change estimation table TT1 are generated on the basis of the amounts, indicated in the second row of the impact table TM4 illustrated in FIG. 6, of changes because of the aforementioned assumption that if the "same system uses virtual machines", "purposes of the use of the virtual machines are the same", and "the number of virtual machines used for the same purpose by the same system is not changed", the amounts of impacts do not vary depending on the virtual machines.

In the impact amount generation process of steps S21 to S23, the CPU 201 generates the amounts of impacts on the evaluation items for evaluating performance of the systems using the virtual machines VM6 to VM10 and VM76 executed on the physical machine PM2 with the insufficient memory.

Returning to FIG. 7, after step S23, the CPU 201 executes the risk generation process of steps S24 to S26 in order to generate a risk value indicating a risk that if a virtual machine is stopped, a value of an evaluation item does not satisfy a requested value.

First, the CPU 201 acquires the requested values and current values of the evaluation items for evaluating performance from the monitoring information table MT2 and the configuration information table MT1 for each of the "systems using the virtual machines" (in step S24), while the "systems using the virtual machines" are indicated in the change estimation table TT1. Specifically, the CPU 201 acquires the requested response times, the current response times, the requested maximum numbers of simultaneous possible connections, and the numbers of current simultaneous connections from the monitoring information table MT2. In addition, the CPU 201 acquires the current maximum numbers of simultaneous possible connections from the configuration information table MT1.

Then, the CPU 201 generates a violation verification table TT2 on the basis of the change estimation table TT1 generated in step S23 and the requested and current values, acquired in step S24, of the evaluation items for evaluating performance (in step S25).

FIG. 10 is a diagram illustrating an example of the violation verification table TT2 according to the embodiment. In the change estimation table TT1 illustrated in FIG. 9, the amounts of impacts on the evaluation items for evaluating performance vary for each of pairs of the "systems using the virtual machines executed on the physical machine with the insufficient memory" and the "purposes of the use of the virtual machines". The violation verification table TT2 illustrated in FIG. 10 stores the amounts of impacts on the evaluation items for evaluating performance, the requested values of the evaluation items for evaluating performance, and the current values of the evaluation items for evaluating performance for each of the pairs of the "systems using the virtual machines executed on the physical machine with the insufficient memory" and the "purposes of the use of the virtual machines". As illustrated in FIG. 9, five pairs are associated to the virtual machines VM6 to VM10 and VM76 executed on the physical machine PM2. Thus, the violation verification table TT2 stores the amounts of impacts, the requested values, and the current values for the five pairs.

Returning to FIG. 7, the CPU 201 generates, on the basis of the violation verification table TT2 generated in step S25, risk values of the evaluation items for evaluating performance for each of the pairs of the systems using the virtual machines to be determined whether to be stopped or not and the purposes of the use of the virtual machines to be determined whether to be stopped or not (in step S26). The risk values according to the embodiment are calculated as the ratios (=(the impact amounts)/((the requested values)−(the current values))) of the impact amounts to the differences between the requested values and the current values and are used to determine whether or not the values of the evaluation items for evaluating performance satisfy the requested values.

FIG. 11 is a diagram illustrating an example of the risk values according to the embodiment. FIG. 11 illustrates a list of the risk values generated by the CPU 201 in step S26. The list illustrated in FIG. 11 includes the risk values for the five pairs.

If a risk value is smaller than 1 or the amount of an impact on an evaluation item is smaller than a value obtained by subtracting a current value from a requested value, and a virtual machine that corresponds to a pair of a "system using virtual machines executed on a physical machine with an insufficient memory" and a "purpose of the use of the virtual machine" is stopped, the requested value of the evaluation item is satisfied. If the risk value is equal to or larger than 1 or the amount of the impact on the evaluation item is equal to or larger than the value obtained by subtracting the current value from the requested value, and the virtual machine that corresponds to the pair of the "system using the virtual machines executed on the physical machine with the insufficient memory" and the "purpose of the use of the virtual machine" is stopped, the requested value of the evaluation item is not satisfied or the SLA is violated.

Even if a certain virtual machine that corresponds to a pair of a "system using virtual machines executed on a physical machine with an insufficient memory" and a "purpose of the use of the certain virtual machine" is stopped, and risk values are close to 0, impacts on the evaluation items for evaluating performance are small. If the certain virtual machine that corresponds to the pair of the "system using the virtual machines executed on the physical machine with the insufficient memory" and the "purpose of the use of the certain virtual machine" is stopped, and the risk values are smaller than 1, but close to 1, the impacts on the evaluation items for evaluating performance are large and the requested values may not be actually satisfied.

For example, for a pair of the "personnel management system SY1" and the "web server" that are indicated in the first row of the violation verification table TT2 illustrated in FIG. 10, a risk value of the response time is 0.689 (=the impact amount of 153 ms/the requested value of 3000 ms–the current value of 2778 ms), as indicated in the first row the list illustrated in FIG. 11. Specifically, even if a virtual machine that corresponds to the pair of the personnel management system SY1" and the "web server" is stopped, the response time is smaller than 3000 ms and does not cause a violation of the SLA.

In addition, a risk value of the maximum number of simultaneous possible connections is 0.426 (=the impact amount of 20 (terminals)/the requested value of 60 (terminals)–13 current connections (terminals)), as indicated in the first row of the list illustrated in FIG. 11. If the virtual machine that corresponds to the pair of the "personnel management system SY1" and the "web server" is stopped, the maximum number of simultaneous possible connections is reduced from the requested value of 60 terminals to 40 (=60–20) terminals. The number of simultaneous connections may temporarily and rarely reach 60 that is the maximum number of simultaneous possible connections. Even if the maximum number of simultaneous possible connections is reduced to 40 terminals, the 13 terminals that are currently connected may continue to be connected and do not cause a problem with a system operation. If the risk value of the maximum number of simultaneous possible connections is smaller than 1, the maximum number of simultaneous possible connections is regarded not to cause a violation of the SLA.

After step S26, the CPU 201 executes the process of determining a virtual machine to be stopped in steps S27 and S28.

First, the CPU 201 acquires a penalty amount for each of the systems from the monitoring information table MT2 and generates a penalty management table TT3 on the basis of the penalty amounts and the risk values generated in step S26 (in step S27).

FIG. 12 is a diagram illustrating an example of the penalty management table TT3 according to the embodiment.

The penalty management table H3 illustrated in FIG. 12 stores risk values of the evaluation items for evaluating performance and penalty amounts when the requested values of the evaluation items for evaluating performance are not satisfied for each of the pairs of the "systems using the virtual machines executed on the physical machine with the insufficient memory" and the "purposes of the use of the virtual machines", while the pairs are indicated in the violation verification table TT2 illustrated in FIG. 10.

In addition, the penalty management table TT3 stores results of determining, on the basis of the risk values of the evaluation items for evaluating performance, whether or not the SLA is violated. If a risk value is smaller than 1, the determination result indicates that the SLA is "not violated". If the risk value is equal to or larger than 1, the determination result indicates that the SLA is "violated".

For example, the first row of the penalty management table TT3 illustrated in FIG. 12 indicates that a risk value of the response time is 0.689 and smaller than 1 and a requested value of the response time is satisfied even if a single virtual machine that is used as a web server of the personnel management system SY1 is stopped. Thus, the CPU 201 determines that the SLA is "not violated" by the response time. Similarly, a risk value of the maximum number of simultaneous possible connections is 0.426 and smaller than 1 and a requested value of the maximum number of simultaneous possible connections is satisfied even if a single virtual machine that is used as a web server of the personnel management system SY1 is stopped. Thus, the CPU 201 determines that the SLA is "not violated" by the maximum number of simultaneous possible connections.

The penalty management table TT3 illustrated in FIG. 12 stores a substantial penalty value obtained by multiplying a risk value by a penalty amount for each of pairs, "systems using virtual machines executed on the physical machine with the insufficient memory" and "purposes of the use of the virtual machines", that have risk values that are smaller than 1. The substantial penalty values are expected penalty values calculated on the basis of the risk values.

As illustrated in FIG. 12, if multiple risk values exist for each of the pairs, the penalty management table TT3 stores a substantial penalty value obtained by multiplying the largest risk value by a penalty amount for each of pairs, "systems using virtual machines executed on the physical machine with the insufficient memory" and "purposes of the use of the virtual machines", that have all the risk values that are smaller than 1 (or do not cause a violation). In other words, a substantial penalty value is calculated using a risk value of an evaluation item that may violate the SLA at the highest rate among the evaluation items for evaluating performance.

For example, for pairs (indicated in the first, third, and fourth rows of the penalty management table TT3 illustrated in FIG. 12) of which all risk values are smaller than 1, a risk value, indicated in the first row, of the response time is 0.689 and larger than 0.425 that is a risk value, indicated in the first row, of the maximum number of simultaneous possible connections. Thus, a substantial penalty value is calculated by multiplying the largest risk value of 0.689 by the penalty amount of 200,000 yen or is 137,838 yen. Similarly, a substantial penalty value of the third row is 31,250 yen, and a substantial penalty value of the fourth row is 54,090 yen.

Returning to FIG. 7, after step S27, the CPU 201 determines a virtual machine to be stopped (in step S28). Specifically, the CPU 201 determines, on the basis of the penalty management table TT3 (illustrated in FIG. 12) generated in step S27, a pair of a "system using the virtual machine to be stopped" and a "purpose of the use of the virtual machine to be stopped" among pairs (pairs indicated in the first, third, and fourth rows in the example illustrated in FIG. 12) that do not cause a violation of the SLA. Then, the CPU 201 references the physical machine configuration information (illustrated in FIG. 8) generated in step S21 and determines the virtual machine that is to be stopped and corresponds to the "system using the virtual machine to be stopped" and the "purpose of the use of the virtual machine to be stopped".

For example, all risk values of the pairs indicated in the first, third, and fourth rows of the penalty management table TT3 illustrated in FIG. 12 are smaller than 1, and the pairs indicated in the first, third, and fourth rows do not cause a violation of the SLA. A risk value of a response time corresponding to a pair indicated in the second row of the penalty management table TT3 is larger than 1, and the pair indicated in the second row causes a violation of the SLA. A risk value of the maximum number of simultaneous possible connections corresponding to a pair indicated in the fifth row of the penalty management table TT3 is larger than 1, and the pair indicated in the fifth row causes a violation of the SLA. If multiple pairs that do not cause a violation of the SLA exist, the CPU 201 preferably determines a pair having the minimum substantial penalty value as the pair of the "system using the virtual machine to be stopped" and the "purpose of the use of the virtual machine to be stopped". In the example illustrated in FIG. 12, therefore, the pair, indicated in the third row, of the "communication management system SY2" and the "web server" is preferably the pair of the "system using the virtual machine to be stopped" and the "purpose of the use of the virtual machine to be stopped".

Then, the CPU 201 references the physical machine configuration information illustrated in FIG. 8 and determines, as the virtual machine to be stopped, the virtual machine VM7 used as the "web server" by the "communication management system SY2", while the "communication management system SY2" is the system using the virtual machine to be stopped and the "web server" is the purpose of the use of the virtual machine to be stopped.

If each of all the pairs, indicated in the penalty management table TT3, of the "systems using the virtual machines executed on the physical machine with the insufficient memory" and the "purposes of the use of the virtual machines" has at least one evaluation item of which a risk value is equal to or larger than 1, or all the pairs cause a violation of the SLA, the CPU 201 preferably determines a pair having the minimum substantial penalty value as the pair of the "system using the virtual machine to be stopped" and the "purpose of the use of the virtual machine to be stopped".

If a plurality of virtual machines that correspond to the pair of the "system using the virtual machine to be stopped" and the "purpose of the use of the virtual machine to be stopped" are indicated in the physical machine configuration information illustrated in FIG. 8, the CPU 201 preferably references the configuration change management table MT3 illustrated in FIG. 5 and determines, as the virtual machine to be stopped, a virtual machine added at the latest time. For example, in the change estimation table TT1 illustrated in FIG. 9, the virtual machines VM6 and VM76 belong to the same pair. In this case, the virtual machine VM76 added at the latest time is determined as the virtual machine to be stopped.

As described above, in the embodiment, the CPU 201 of the management server MS executes the virtual machine determination program PG4, generates the amounts of changes, caused by the addition of a virtual machine, in values of the evaluation items for evaluating performance of the systems, and generates, on the basis of the generated amounts of the changes, the amounts of impacts, caused by the stop of a virtual machine, on the evaluation items for evaluating performance of the systems. Next, the CPU 201 generates risk values on the basis of the amounts of the impacts on the evaluation items for evaluating performance, requested values of the evaluation items for evaluating performance, and current values of the evaluation items for evaluating performance. Then, the CPU 201 determines a virtual machine to be stopped on the basis of penalty amounts and the risk values.

In other words, the management server MS uses the actual amounts of changes, caused by a change in the number of virtual machines, in values of the evaluation items for evaluating performance and thereby estimates the amounts of impacts, caused by the stop of a virtual machine, on the evaluation items for evaluating performance. The CPU 201 estimates the amounts of the impacts, caused by the stop of the virtual machine, on the evaluation items for evaluating performance set for the systems and risk values and determines a virtual machine to be stopped.

Thus, even if the evaluation items for evaluating performance defined in the SLA and requested values of the evaluation items for evaluating performance vary for each of the systems, the management server MS may use highly accurate data to determine a virtual machine to be stopped on the basis of the evaluation items for evaluating performance and the requested values.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system having a plurality of servers each of which executes a corresponding plurality of virtual machines and a plurality of systems each accessing at least one of the corresponding plurality of virtual machines executed by the plurality of servers, the information processing system comprising:
    circuitry configured to:
        detect a server, among the plurality of servers, having insufficient resources for executing a corresponding plurality of virtual machines;
        identify the plurality of systems that each access at least one of the corresponding plurality of virtual machines executed by the server;
        generate, for each system of the identified plurality of systems, a risk value indicating whether performance of the system satisfies a service level agreement for the system if a virtual machine accessed by the system is stopped;
        generate a penalty management table on the basis of acquired penalty amounts for the systems and risk values generated for the system;
        determine a particular virtual machine to be stopped among the corresponding plurality of virtual machines executed by the server when a particular risk value, among the risk values, of a particular system that accesses the particular virtual machine is less than a predetermined threshold and has a smallest penalty amount; and
        stop the particular virtual machine, wherein
    the circuitry is configured to generate the risk value based on a first difference between a performance set in the service level agreement for the system and a current performance for the system at a current time before execution of the virtual machine is stopped, and a second difference between a performance for the system at a first time before execution of the virtual machine is stopped and a performance for the system at a second time after execution of the virtual machine is stopped, and
    the risk value corresponds to a ratio between the second difference and the first difference.

2. The information processing system according to claim 1, wherein the circuitry is configured to determine a specific virtual machine for which the first difference is smaller than the second difference as the particular virtual machine.

3. The information processing system according to claim 1, wherein the circuitry is configured to acquire the second difference based on information generated when the virtual machine is newly added to the server.

4. The information processing system according to claim 1, wherein the second difference depends on a purpose of the virtual machine for the system.

5. The information processing system according to claim 1, wherein the circuitry is configured to determine the particular virtual machine based on the first difference, the second difference, and a penalty levied when the service level agreement for the system accessing the particular virtual machine is not satisfied.

6. The information processing system according to claim 1, wherein the current performance corresponds to at least one of a response time for the system or a maximum number of simultaneous possible connections for the system.

7. The information processing system according to claim 1, wherein the circuitry is configured to detect the server by detecting whether total resources provided to the plurality of virtual machines executed by the server exceeds an upper limit.

8. The information processing system according to claim 1, wherein
one of the plurality of systems accesses a corresponding plurality of virtual machines executed by a plurality of servers including a server having insufficient resources, and
the circuitry is configured to control the one of the plurality of systems to access at least one virtual machine executed by at least one of the plurality of servers other than the server having insufficient resources.

9. The information processing system according to claim 1, wherein the circuitry is configured to determine the particular virtual machine based on the values so that a performance of each system satisfies service level agreements for each system.

10. The information processing system according to claim 1, wherein the information processing system is a single server.

11. A non-transitory computer-readable recording medium having stored therein a program for causing circuitry of an information processing system to execute a process, the information processing system having a plurality of servers each of which executes a corresponding plurality of virtual machines and a plurality of systems each accessing at least one of the corresponding plurality of virtual machines executed by the plurality of servers, the process comprising:
detecting a server, among the plurality of servers, having insufficient resources for executing a corresponding plurality of virtual machines;
identifying the plurality of systems that each access at least one of the corresponding plurality of virtual machines executed by the server;
generating, for each system of the identified plurality of systems, a risk value indicating whether performance of the system satisfies a service level agreement for the system if a virtual machine accessed by the system is stopped;
generating a penalty management table on the basis of acquired penalty amounts for the systems and risk values generated for the system;
determining a particular virtual machine to be stopped among the plurality of virtual machines executed by the server when a particular risk value, among the risk values, of a particular system that accesses the particular virtual machine is less than a predetermined threshold and has a smallest penalty amount; and
stopping the particular virtual machine, wherein
the generated risk value is based on a first difference between a performance set in the service level agreement for the system and a current performance for the system at a current time before execution of the virtual machine is stopped, and a second difference between a performance for the system at a first time before execution of the virtual machine is stopped and a performance for the system at a second time after execution of the virtual machine is stopped, and
the risk value corresponds to a ratio between the second difference and the first difference.

12. A method performed by an information processing system having a plurality of servers each of which executes a corresponding plurality of virtual machines and a plurality of systems each accessing at least one of the corresponding plurality of virtual machines executed by the plurality of servers, the method comprising:
detecting a server, among the plurality of servers, having insufficient resources for executing a corresponding plurality of virtual machines;
identifying the plurality of systems that each access at least one of the corresponding plurality of virtual machines executed by the server;
generating, for each system of the identified plurality of systems, a risk value indicating whether performance of the system satisfies a service level agreement for the system if a virtual machine accessed by the system is stopped;
generating a penalty management table on the basis of acquired penalty amounts for the systems and risk values generated for the system;
determining a particular virtual machine to be stopped among the corresponding plurality of virtual machines executed by the server when a particular risk value, among the values, of a particular system that accesses the particular virtual machine is less than a predetermined threshold and has a smallest penalty amount; and
stopping the particular virtual machine, wherein
the generated risk value is based on a first difference between a performance set in the service level agreement for the system and a current performance for the system at a current time before execution of the virtual machine is stopped, and a second difference between a performance for the system at a first time before execution of the virtual machine is stopped and a performance for the system at a second time after execution of the virtual machine is stopped, and
the risk value corresponds to a ratio between the second difference and the first difference.

* * * * *